US006925455B2

(12) United States Patent
Gong et al.

(10) Patent No.: US 6,925,455 B2
(45) Date of Patent: Aug. 2, 2005

(54) CREATING AUDIO-CENTRIC, IMAGE-CENTRIC, AND INTEGRATED AUDIO-VISUAL SUMMARIES

(75) Inventors: Yihong Gong, Sunnyvale, CA (US); Xin Liu, Berkeley, CA (US)

(73) Assignee: NEC Corporation, Tokyo (JP)

( * ) Notice: Subject to any disclaimer, the term of this patent is extended or adjusted under 35 U.S.C. 154(b) by 793 days.

(21) Appl. No.: 10/011,215

(22) Filed: Oct. 25, 2001

(65) Prior Publication Data

US 2002/0093591 A1 Jul. 18, 2002

Related U.S. Application Data

(60) Provisional application No. 60/254,534, filed on Dec. 12, 2000.

(51) Int. Cl.[7] .................................................. G06N 5/00
(52) U.S. Cl. .......................... 706/45; 370/352; 370/252
(58) Field of Search ............................ 706/45; 370/352, 370/252

(56) References Cited

U.S. PATENT DOCUMENTS

| 5,867,494 A | * | 2/1999 | Krishnaswamy et al. ... 370/352 |
| 5,867,495 A | * | 2/1999 | Elliott et al. ................. 370/352 |
| 5,999,525 A | * | 12/1999 | Krishnaswamy et al. ... 370/352 |
| 6,335,927 B1 | * | 1/2002 | Elliott et al. ................. 370/352 |
| 6,731,625 B1 | * | 5/2004 | Eastep et al. ................ 370/352 |
| 6,754,181 B1 | * | 6/2004 | Elliott et al. ................. 370/252 |

OTHER PUBLICATIONS

A. Berger, S.D. Pietra, and D. Pietra, "A maximum entropy approach to natural language processing, " *Journal of Computational Linguistics*, vol. 22, 1996.
Y. Gong and X. Liu, "Generic Text summarization using relevance measurement and singular value decomposition," tech. Rep., NEC USA, Inc. Nov. 2000.
Y. Gong and X. Liu, "Video summarization using singular value decomposition," in *Proceedings of IEEE International Conference of Computer Vision and Pattern Recognition* (CVPR'00), 2000.

* cited by examiner

Primary Examiner—Wilbert L. Starks, Jr.
(74) Attorney, Agent, or Firm—Sughrue Mion, PLLC (57) ABSTRACT

Systems and methods create high quality audio-centric, image-centric, and integrated audio-visual summaries by seamlessly integrating image, audio, and text features extracted from input video. Integrated summarization may be employed when strict synchronization of audio and image content is not required. Video programming which requires synchronization of the audio content and the image content may be summarized using either an audio-centric or an image-centric approach. Both a machine learning-based approach and an alternative, heuristics-based approach are disclosed. Numerous probabilistic methods may be employed with the machine learning-based learning approach, such as naïve Bayes, decision tree, neural networks, and maximum entropy. To create an integrated audio-visual summary using the alternative, heuristics-based approach, a maximum-bipartite-matching approach is disclosed by way of example.

78 Claims, 6 Drawing Sheets

Solution (i)

FIG. 2C

Solution (ii)

FIG. 2D

Solution (i)

FIG. 2E

Solution (ii)

FIG. 2F

Solution (i)

FIG. 3A

Solution (ii)

FIG. 3B

CREATING AUDIO-CENTRIC, IMAGE-CENTRIC, AND INTEGRATED AUDIO-VISUAL SUMMARIES

This application claims the benefit of U.S. Provisional Application No. 60/254,534, filed Dec. 12, 2000, and incorporated by reference herein.

BACKGROUND OF THE INVENTION

1. Field of the Invention

The present invention is related generally to video summarization techniques, and more particularly to methods and systems of creating video summaries through seamlessly integrating image, audio, and text features extracted from input video.

2. Description of the Related Art

Lengthy articles, treatises, or other text documents often include abstracts, which help readers ascertain quickly, without a detailed analysis of the entire document, whether the document's contents are of interest. As can be the case with a text document, the content and nature of a video program often cannot be captured at a glance. In similar fashion, it generally is desirable to provide an abstract or summary for long video programs in order to show overall content in a general fashion.

Recently, the explosive growth of the World-Wide Web (WWW or Web) has dramatically increased the number of on-line text and multimedia data collections. As this trend toward more on-line multimedia content continues, automatic data summarization techniques that assist users in quickly identifying the most relevant information from vast volumes of data are becoming more and more significant.

In this context, video summarization presents substantial challenges. The task is challenging because it requires, initially, summarization of both the image track and the audio track of a video program. Effective integration of the two summaries in a natural way presents an additional challenge.

In general, most kinds of video summarization can be classified into three categories: audio-centric summarization, image-centric summarization, and integrated audio-visual summarization. There are certain types of video programming, such as news broadcasts, documentaries, and video seminars, for example, which do not have a strong correlation between the associated audio and image tracks. For such video categories, it is appropriate to employ an integrated audio-visual summarization approach that maximizes coverage of both audio and image content, while providing a loose audio and image alignment. On the other hand, other types of video programs, such as movies, dramas, talk shows, and the like, may have a strong correlation between the audio and image tracks. For these types of video programs, synchronization between the audio presentation and the video images is critical; in these circumstances, it is appropriate to employ a summarization methodology that is either audio-centric or image-centric.

Conventional systems have failed to provide a comprehensive solution to the problem of effective and efficient summarization for these various types of video programming. Many video summarization systems and methods presently in use heuristically deem certain types of video content as important, and create summaries by extracting these pre-identified contents from the input video. Consequently, these video summarization systems and methods are very domain and application specific, and are not capable of creating summaries based on user' individual needs, or of handling wide varieties of video programs.

SUMMARY OF THE INVENTION

The present invention overcomes the foregoing and other shortcomings of conventional video summarization techniques by providing a system and method of video summarization based upon a machine learning framework. The invention also provides a further system and method to handle circumstances in which training data required by machine learning framework are difficult to obtain. These systems and methods are able to create high quality audio and image summaries by seamlessly integrating image, audio, and text features extracted from the input video.

As a specific example of a video program which does not rely upon a strong synchronization between the audio track and the image track, consider a television news program in which an audio segment presents information concerning the number of casualties caused by a recent earthquake. The corresponding image segment may be a close shot of a reporter in the field, or of rescue teams working at the scene of a collapsed building, or of a regional map illustrating the epicenter of the quake. In these situations, the audio content often does not necessarily refer to the corresponding image content. As noted above, other examples of such video programming include documentaries, seminars, and so forth.

In accordance with one embodiment of the present invention, an integrated audio-visual summarization technique may be employed to summarize video programming when strict synchronization is not required. In summarizing such video programming, it is desirable to create audio and image summaries separately; subsequently, the two summaries may be integrated with a loose degree of alignment. With this approach, the coverage for both the audio content and the image content may be maximized in the summary.

Conversely, video programs which require a strong synchronization between the audio content and the image content generally may be characterized by the fact that the audio track at a particular moment in time is directly related to the images presented at that moment, and vice versa. In summarizing such video programming, synchronization between audio and image is critical; consequently, it is desirable that the summarization be either audio-centric or image-centric.

In accordance with one embodiment, an audio-centric summarization technique may ascertain the important aspects of the audio content associated with the video program; to achieve the necessary degree of synchronization, the image summary may be generated only by selecting video frames corresponding to the audio segments that constitute the audio summary. An image-centric summarization technique may first summarize the image track by identifying important image segments of the video program; subsequently, audio segments corresponding to these important or representative image segments may be included in the overall video summary.

The process of creating summaries may be facilitated by using clues and features from images, audio signals, speech transcripts, and closed caption text. The image features, speech transcripts, and closed caption text may be combined with the corresponding audio features to improve audio summarization, while the audio features, speech transcripts, and closed caption text may be combined with the relevant image features to facilitate better image summarization.

To achieve audio-centric, image-centric, or integrated audio-visual summarization, two embodiments are described herein. According to one technique, machine learning, using training data which may exemplify previous summarization preferences, are applied to audio and/or image tracks of a video program, depending on which of the summarization techniques is preferred for the given application. With this technique, it is possible for the system to mimic behavior exhibited in sample video summaries, and to learn from such samples and from its own implementation of the samples, using any of a number of known algorithmic approaches. Another embodiment described herein is applicable where training data may not be readily available or easy to apply to provide the necessary instruction to the system, the invention contemplates an alternative method.

The above-mentioned and other attendant advantages of the present invention will become more apparent upon examination of the following detailed description of the preferred embodiments thereof with reference to the attached drawing figures.

BRIEF DESCRIPTION OF THE DRAWINGS

FIGS. 2A–2F are diagrams in which

DETAILED DESCRIPTION OF THE PREFERRED EMBODIMENTS

Figure 1A:
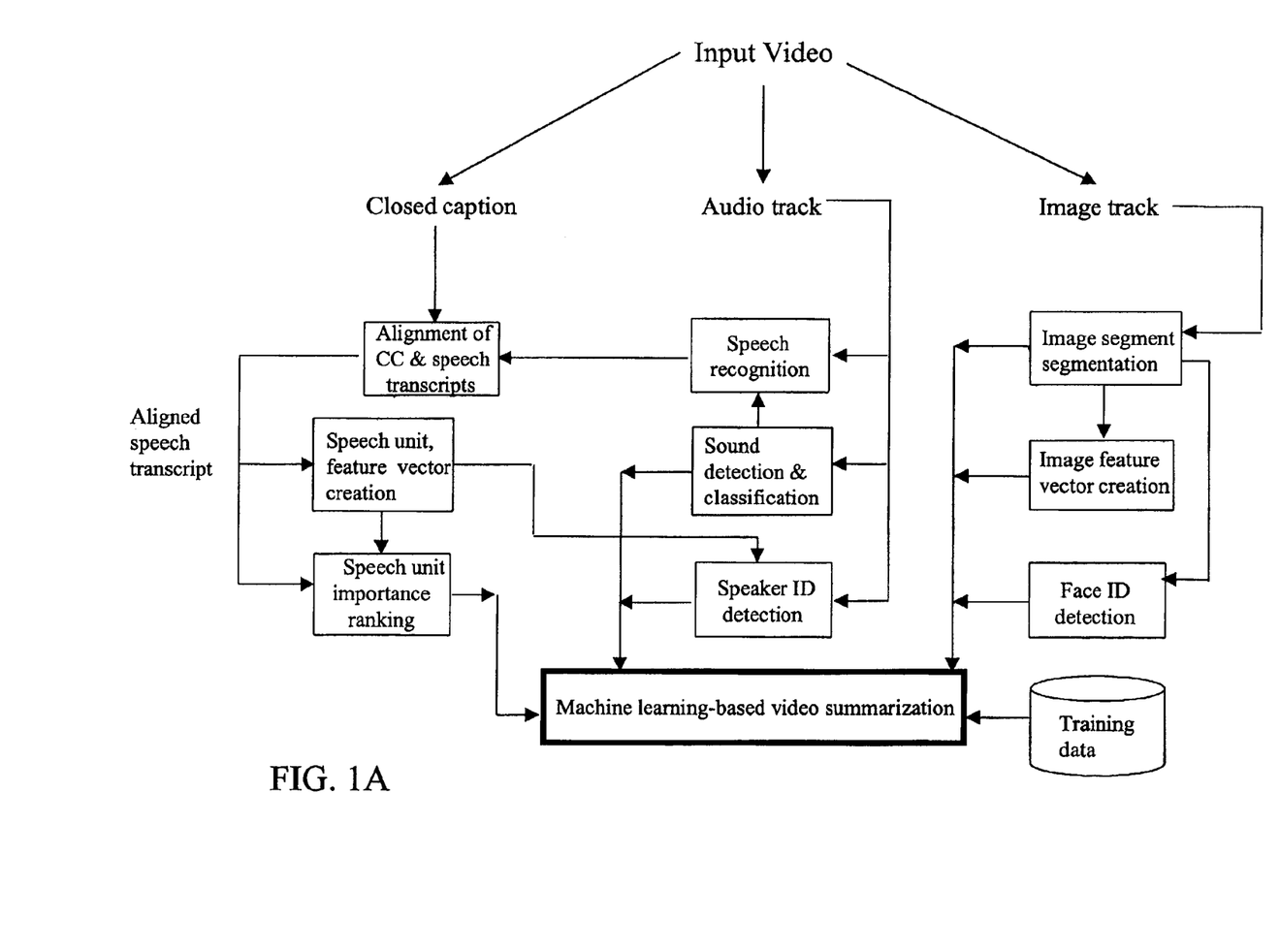
FIG. 1A is a flowchart illustrating the operation of one embodiment of the inventive audio-visual summarization system and method.

With reference now to the drawings, FIG. 1A is a simplified flowchart illustrating the operation of one embodiment of the invention, relating to a machine learning-based video summarization system and method. With reference to FIG. 1A, the following description describes the types of mathematical models which may be employed; the features used for audio and visual summarization; and methods of aligning audio and visual summaries.

Machine Learning Framework

Typical video programming contains both an audio track and an image track, both of which may be lengthy and continuous. To summarize such video programming, both the audio track and the image track comprising the video must be segmented into meaningful and manageable operational units. By way of example, meaningful audio operational units may include utterance of one word, one phrase, one sentence, or any other audio segment possessing coherent acoustic profiles. Similarly, examples of possible image operational units include a single camera shot, a series of sequential camera shots, clusters of image frames that may be grouped by certain criteria, and so forth.

In this context, a vector or feature set, X, may represent an audio or image operational unit; additionally, X may include a number of features, x, which may be image features, audio features, text features (e.g., important keywords from speech transcripts or closed captions) associated with the audio or image operational unit. Where a number, n, of features, x, are present in a particular vector or feature set X, then $X=[x_1, x_2, \ldots, x_n]$. The summarization task may be transformed into a binary classification problem that computes the probability $P(y|X)$, given the feature set X. Here y is a binary variable, and its values one and zero represent respective states whereby X is, and is not, included in the summary. This probability $P(y|X)$ can be determined using rule-based approaches, or can be estimated using machine learning methods. In the latter case, training data will be provided to the machine learning system, and the system will learn the model that predicts the probability $P(y|X)$ in agreement with the provided training data.

Any of a variety of known machine learning techniques, including, but not limited to, the Naïve Bayes method, the decision tree method, the neural network method, the maximum entropy method, and the like, can be used to estimate the probability $P(y|X)$. Such techniques are well known to ordinarily skilled artisans in this technological field, and so need not be detailed here.

System Configuration

As noted above, FIG. 1A is a simplified flowchart illustrating the operation of one embodiment of a machine learning-based video summarization system and method. The system examines the image track and the audio track of a video input; additionally, the system may examine any closed captioning associated with the input video. A system and method of video summarization may perform alignment among these three input components: a closed caption; an audio track; and an image track. Feature extractions and specialized operations for each input component may be performed. The extracted features and the output of each component operation then may be provided as input into a machine learning-based summarization module to create an integrated audio-visual summary, or either an audio-centric summary or an image-centric summary. The following operations generally may be performed with respect to each of the input components:

Sound detection and classification: Detect audio segments that consist of non-speech sounds, such as music, applause, hail, explosions, thunder, gunshots, and the like; segment them into sound units, each of which possesses a coherent acoustic profile; classify these units according to their contents; and for each sound unit, output the following data: a starting time code for the sound unit within the audio track; a duration of the sound unit, and the category or type of sound unit.

Speech recognition: Exclude those non-speech audio segments detected by the sound detection and classification module; perform speech recognition on the remaining audio segments to generate speech transcripts; output each recognized word, its starting time code within the audio track, and its duration.

Alignment of closed caption and speech transcript: Perform alignment between the closed caption and the speech transcript from the speech recognizer. A closed caption may contain a number of typing mistakes, and the speech transcript from the speech recognizer may contain a number of recognition errors. Alignment between the closed caption and the speech transcript serves to improve the accuracy of the speech transcript.

Speech unit and feature vector creation: Generate speech operational units based on the aligned speech transcript, and create a feature vector for each speech unit. By way of example, meaningful speech units may include one word, one phrase, one sentence, or any other segment possessing meaningful speech content.

Speech unit importance ranking: Compute the importance rank of each speech unit; this importance ranking may use methods known in the art such as, for example, that described in Provisional Application No. 60/254,535, filed Dec. 12, 2000, entitled "Text Summarization Using IR Technique And Singular Value Decomposition," the disclosure of which is hereby incorporated by reference, and U.S. application Ser. No. 09/817,591, filed Mar. 26, 2001, entitled "Generic Text Summarization Using Relevance Measure and Latent Semantic Analysis," the disclosure of which also is incorporated by reference.

Speaker ID detection: Receive the speech units from the speech unit and feature vector creation module; determine the identity of the speaker (i.e. speaker identification detection) for each of the speech units.

Image segment segmentation: Segment the image track into individual image segments, each of which possesses coherent image and motion profiles. The resulting image segments may be used as image operational units.

Image feature vector creation: Extract image features and form a feature vector for each image segment. Any image features that capture certain aspects of image segment contents can be used to form the feature vector.

Face ID detection: Detect and identify human faces, if any, contained in each image segment.

Once the above operations have been performed, outputs may be fed into the machine learning-based summarization module, where audio and visual summaries may be created using a machine learning framework as described previously. The audio summarization process may involve computing, for each speech or sound unit X, the probability P(y|X) that the unit is significant enough to be included in the audio summary. As noted above, the following features associated with each speech or sound unit may be used with the machine learning framework: the starting time code, the duration, and the importance rank of the speech unit, the starting time code, the duration, and the category of the sound unit; the speaker identity; the face identity, and the image feature vector of the corresponding images. Once the probability P(y|X) for each speech or sound unit X is computed, the audio summary may be created by selecting speech or sound units in descending order of their probability P(y|X), until the audio summary reaches the user specified length $L_{sum}$.

On the other hand, visual summarization may use the image segments created in the above operations as operational units. The visual summarization process similarly may employ the machine learning framework to compute, for each image segment S, for example, the probability P(y|S) that the image segment is important enough to be included in the visual summary. As described above, by way of example, the following features associated with each image segment S may be considered: the length (i.e. the number of consecutive, sequential, or otherwise related frames); the image feature vector; the identity of the person or face depicted in the image segment; the presence of special frames, such as black frames, image logos, and the like; human and object motion; camera motion, such as zooming, panning, etc.; the corresponding speech and sound units; and the identity of the speaker associated with the corresponding speech units. Once the probability P(y|S) for each image segment S is computed, the visual summary may be created by selecting image segments in descending order of their probability P(y|S), until the visual summary reaches the user specified length $L_{sum}$.

It is not necessary that a visual summary contain each selected image segment from its beginning to its end. If the average time length of the image segments comprising the original video program is long, but the user specified summary length $L_{sum}$ is short, then the visual summary will be composed by only a few image segments, which can lead to a dramatic loss of the original visual content. To enable the user to influence the visual summary creation outcome, the user may be asked to specify not only the summary length $L_{sum}$, but also the minimum playback time $L_{min}$. $L_{sum}$ indicates how much time the user is willing to spend to comprehend the overall visual content, while $L_{min}$ provides the user with the ability to choose between a breadth-oriented visual summary and a depth-oriented visual summary. For example, a small value for $L_{min}$ may be used to produce a breadth-oriented visual summary that consists of a larger number of shorter image segments. On the other hand, a large value for $L_{min}$ may be used to produce a depth-oriented visual summary that consists of a smaller number of longer image segments.

Once the user specifies $L_{sum}$ and $L_{min}$, the total number of image segments that can be included within the visual summary equals $$C = \min\left(\frac{L_{sum}}{L_{min}}, |\Omega|\right),$$

where $|\Omega|$ denotes the total number of image segments in the original video. Additionally, the time length that can be assigned to each selected image segment equals $$L = \frac{L_{sum}}{C}.$$

In this context, the visual summary may be created by selecting C image segments in descending order of their probability P(y|S), taking the first L seconds of each of the C image segments, and then concatenating them in ascending time order.

Alignment Between Audio and Visual Summaries

Once the audio and visual summaries are created, the last issue to be addressed is how to synchronize the two summaries. Let V=(I,A) be a video sequence that consists of audio track A and image track I. An audio summary of V can be denoted as $A_{sum}=\{A(t_i,\tau_i)\in A|i=1,\ldots,N(A_{sum})\}$, where $A(t_i,\tau_i)$ represents the audio segment that starts at time $t_i$ and lasts for time $\tau_i$, and $N(A_{sum})$ denotes the number of audio segments comprising $A_{sum}$. All the audio segments in $A_{sum}$ are arranged in ascending order of their starting time $t_i$. Similarly, a visual summary of V can be denoted as $I_{sum}=\{I(t_j,\tau_j)\in I|j=1,\ldots,N(I_{sum})\}$, with all the components sorted in ascending order of their starting time.

As noted above, audio-centric and image-centric summaries minimize the synchronization problem; that is, synchronization may be effectuated simply by taking the corresponding image or audio counterparts, respectively, from the original video programs. For audio-centric summaries, if $A(t_j,\tau_j)\in A_{sum}$, then $I(t_j,\tau_j)\in I_{sum}$. For image-centric summaries, if $I(t_j,\tau_j)\in A_{sum}$, then $A(t_j,\tau_j)\in I_{sum}$. To create integrated audio-visual summaries, because the audio and visual summaries are created separately using the machine learning framework, for each audio segment $A(t_j,\tau_j)\in A_{sum}$, its corresponding image segment $I(t_j,\tau_j)$ does not necessarily belong to $I_{sum}$, and vice versa. Therefore, to maximize the coverage of both the image and audio contents without sacrificing either of them, a loose alignment may be performed between the audio and visual summaries.

For integrated audio-visual summaries, the system designer's, or the user's requirements or preferences about what audio contents must be synchronized to what image contents, and vice versa, may be provided to the summarization system as the predefined alignment specifications. By way of example, synchronization may be desirable or required in the following cases: 1) if an image segment in the visual summary shows a person, and the corresponding audio segment contains that person's speech, then it may be desirable to synchronize the image segment to its audio counterpart, and vice versa; 2) if an audio segment in the audio summary consists of an explosion, and the corresponding image segment shows an explosion, then it may be desirable to synchronize the audio segment to its image counterpart, and vice versa; 3) if an audio segment contains a speech that mentions a celebrity's name, and the celebrity's picture is shown in an image segment that is within a small time window of the audio segment, then it may be desirable to synchronize the audio segment with the image segment showing the celebrity's picture, and vice versa.

In accordance with one embodiment, integrated audio-visual summarization may be implemented as follows.

Similarly to the visual summary creation process described above, an integrated audio-visual summarization may be initiated by asking a user to specify two parameters: the summary length $L_{sum}$ and the minimum playback time $L_{min}$ for each image segment that constitutes the visual summary. Apart from allowing the user to select between the depth-oriented and the breadth-oriented visual summaries, another purpose of introducing the parameter $L_{min}$ is to realize partial alignment between audio and visual summaries. A primary goal for the alignment is that the integrated audio-visual summary should look smooth and natural, and should maximize the coverage for both the audio and the visual content of the original video without sacrificing either of them.

For example, with a news program, sentences spoken by an anchorperson or a reporter may well convey important contents of the news story, and may be given higher probabilities of being included in the audio summary. Corresponding image counterparts of such sentences may be a close shot of the anchorperson in the studio or the reporter in the field. If each spoken sentence in the audio summary is aligned fully with its corresponding image counterpart, the result may be a video summary whose image portion consists mostly of anchorpersons and reporters. A summary created this way may look natural and smooth, but such naturalness and smoothness come at a significant sacrifice of image content. To solve this problem caused by full alignment, the following partial alignment operations between the audio and the visual summaries may be performed instead.

1. As described above, the audio summary may be created by selecting speech or sound units in descending order of their probability.
2. For each component $A(t_i, \tau_i)$ in the audio summary, check the content of its corresponding image segment $I(t_i, \tau_i)$. If the $A(t_i, \tau_i), I(t_i, \tau_i)$ pair meets the predefined alignment requirements provided to the system, align $A(t_i, \tau_i)$ with $I(t_i, \tau_i)$ from time $t_i$ for $L_{min}$ seconds. Otherwise, do not perform the alignment operation for $A(t_i, \tau_i)$. In the following descriptions, time ti is called an alignment point.
3. Once the alignment points have been identified in Step 2, the whole video summary is divided into several time partitions. For two adjacent alignment points $t_i, t_{i+1}$, perform the following operations to create the visual summary for the time period $(t_i, t_{i+1})$:
    a. Fill the time period $(t_i, t_{i+Lmin})$ by $I(t_i, L_{min}) \in I(t_i, \tau_i)$, which fulfills the partial alignment between $A(t_i, \tau_i)$ and $I(t_i, \tau_i)$.
    b. To create the visual summary for the time period $(t_i+L_{min}, t_{i+1})$, find the set $\Theta$ of the image segments that fall into this time period. The total number of image segments that can be included within this time period equals $$C = \min\left(\frac{t_{i+1} - t_i - L_{min}}{L_{min}}, |\Theta|\right),$$

where $|\Theta|$ denotes the number of image segments in the set $\Theta$. Additionally, the time length which can be assigned to each image segment equals $$L = \frac{t_{i+1} - t_i - L_{min}}{C}.$$

Create a visual summary for this time period by selecting the C image segments from $\Theta$ which have the highest probabilities, take the first L seconds of each of the C image segments, and concatenate them in ascending time order.

Alternative Video Summarization System and Method

As described above, the system and method of video summarization based upon a machine learning framework requires training data which may consist of a sufficient number of sample video summaries created previously by human experts. The machine learning-based summarization system and method are able to learn from the expert' sample video summaries, and to create video summaries by mimicking the behavior exhibited in the sample video summaries. However, in some circumstances, it may be too expensive, or very difficult to acquire sample video summaries made by experts. In such circumstances, it may be preferable to provide a system and method which do not need training data.

Figure 1B:
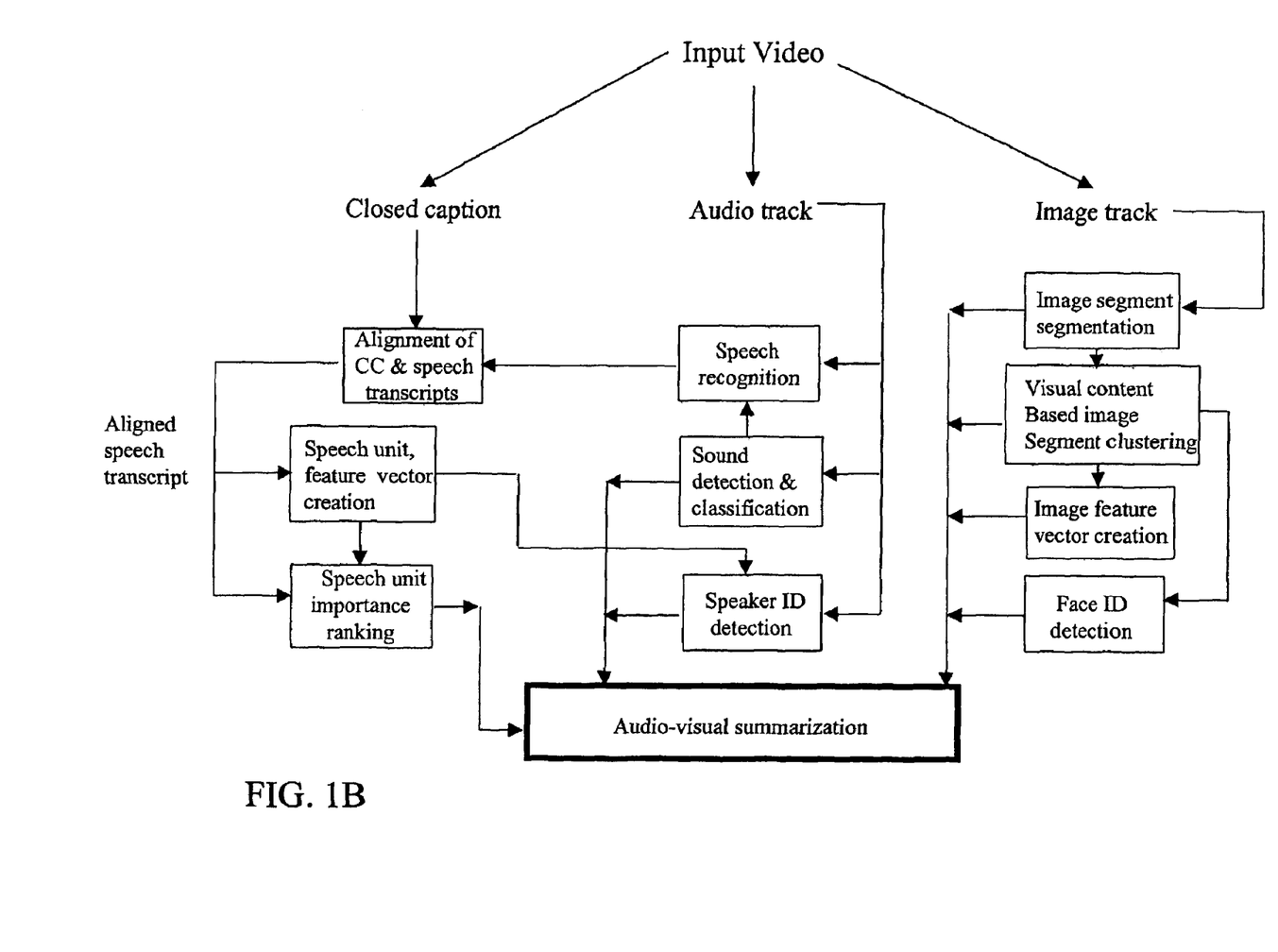
FIG. 1B is a flowchart illustrating the operation of an alternative embodiment of the inventive audio-visual summarization system and method.

FIG. 1B is a simplified flow chart illustrating the operation of one embodiment of an alternative video summarization system and method which do not need training samples. As can be seen from FIG. 1B, the alternative system has a very similar flowchart to that of the foregoing machine learning-based system. Thus, with the alternative system and method which will be described herein, it is possible to obtain audio-centric, image-centric, or integrated audio-visual summaries, as is the case with the first embodiment. Looking at the flowchart of FIG. 1B, all but the following modules of the alternative system are the same as the corresponding modules shown in FIG. 1A:

Visual content-based image segment clustering: In addition to image segment segmentation as in the first embodiment, group image segments into clusters based on their visual similarity and dynamic level; this clustering may use methods such as, for example, that discussed in Y. Gong and X. Liu, *Video Summarization Using Singular Value Decomposition,* in Proceedings of IEEE International Conference of Computer Vision and Pattern Recognition (CVPR'00), or that discussed in Y. Gong and X. Liu, *Summarizing Video By Minimizing Visual Content Redundancies,* in Proceedings of IEEE International Conference of Multimedia and Expo (ICME'01). Each frame cluster may consist of one or more image segments, with all the image segments within the same cluster being visually similar to one another.

Once all the feature extraction operations have been performed by the respective modules, outputs may be fed into the audio-visual summarization module, where either audio summaries or visual summaries, or integrated audio-visual summaries may be created as described below.

In contrast to the machine learning-based video summarization module in the foregoing system, the audio-visual summarization module here does not compute the probability P(y|X) for each speech or sound unit X, nor the probability P(y|S) for each frame cluster S. Instead, it creates an audio summary by selecting speech units in descending order of their importance ranks (received from the speech unit importance ranking module) until the audio summary reaches the user specified length $L_{sum}$. Sound units can be ranked and selected for inclusion in the audio summary using, for example, heuristic rules. As described previously, the importance ranking for speech units may use methods known in the art such as, for example, that described in the above-mentioned Provisional Application No. 60/254,535, filed Dec. 12, 2000, entitled "Text Summarization Using IR Technique And Singular Value Decomposition," the disclosure of which is hereby incorporated by reference, and U.S. application Ser. No. 09/817,591, filed Mar. 26, 2001, entitled "Generic Text Summarization Using Relevance Measure and Latent Semantic Analysis," the disclosure of which also is incorporated by reference. Additionally, the importance ranking may be determined using combinations of heuristic rules and the above-mentioned methods. By way of example, such heuristic rules may give higher ranks to the speech units that contain particular words or phrases, that are spoken by important persons, or that have important corresponding image segments containing special events such as explosions, natural disasters, violence, etc.

To create visual summaries, the alternative system also requires the user's specification of the two parameters $L_{sum}$, $L_{min}$. Here again, heuristic rules may be used to rank the importance of each frame cluster S. In general, any rules that reflect the system designer's or the user's knowledge, desires, or preferences for visual content summarization can be used as heuristic rules. By way of example, such heuristic rules may give higher ranks to the frame clusters that contain particular image features, celebrities, special frames such as company logos, and the like; that possess human and object motion, camera motion, such as zooming, panning, etc.; or the frame clusters whose corresponding speech units are important, or spoken by important persons.

Additionally, the total time length of each frame cluster (the sum of the duration of each constituent image segment) also can be used in the process of rank determination. As each frame cluster may consist of more than one image segment, once a frame cluster has been selected, it still is necessary to determine which image segment(s) within the cluster to use to create the visual summary. If there is no additional information to help with image segment selection, the most straightforward selection method would be to choose the longest image segment in the cluster. The reason for this is that, because all of the image segments within the same cluster are visually similar, the longest image segment will be the one that is the most complete, and best represents the whole cluster. In this context, the total number C of image segments that can be included within the visual summary, and the time length L that can be assigned to each selected image segment can be computed using the same equations as described previously that make use of the two parameters $L_{sum}$, $L_{min}$. The visual summary can be created by selecting C frame clusters in descending order of their importance ranks, taking the first L seconds of the longest image segment from each of the C frame clusters, and then concatenating them in ascending time order.

For integrated audio-visual summaries, similarly to the foregoing machine learning-based system, the alternative system also requires alignment specifications that indicate what audio contents must be synchronized to what image contents, as well as the user's input of the parameters Lsum $L_{sum}$, $L_{min}$. Once the audio summary is created, each component $A(t_i,\tau_i)$ in the audio summary along with its image counterpart $I(t_i,\tau_i)$ are examined to see whether the $A(t_i,\tau_i)$, $I(t_i,\tau_i)$ pair meets the predefined alignment requirements. This examination may identify a set of alignment points which divide the whole video summary into several time partitions. A decision must be made to determine which frame cluster, and which image segment within the selected frame cluster, should be used to fill which time partition. The alignment operations consist of the following two main steps.

1. For each component $A(t_i,\tau_i)$ in the audio summary, check the content of its corresponding image segment $I(t_i,\tau_i)$. If the $A(t_i,\tau_i),I(t_i,\tau_i)$ pair meets the predefined alignment requirements, align $A(t_i,\tau_i)$ with $I(t_i,\tau_i)$ from time $t_i$ for $L_{min}$ seconds. Otherwise, do not perform the alignment operation for $A(t_i,\tau_i)$. Here, time $t_i$ is called an alignment point.

2. Once all the alignment points have been identified in Step 1, the whole video summary is divided into several partitions. Fill each of the partitions by assigning frame clusters from the cluster set (obtained from the visual content-based frame clustering module). This assignment must accommodate the following two constraints:
    a. Single assignment constraint: Each frame cluster can receive only one time slot assignment.
    b. Time order constraint: The time order of all the image segments that constitute the visual summary must be maintained.

In the following, the realization of step 2 of the above alignment operations will be discussed. If it is assumed that the whole time span $L_{sum}$ of the video summary is divided by the alignment points into P partitions, and that the time length of partition i is $T_i$ (see FIG. 2A), then, because each time slot must be at least $L_{min}$ seconds long, partition i will be able to provide $S_i=\lceil T_i/L_{min} \rceil$ time slots, and hence the total number of available time slots becomes $$S_{total} = \sum_{i=1}^{P} S_i.$$

Here the problem is as follows: Given a total of O frame clusters and $S_{total}$ time slots of the video summary, a best matching must be determined between the frame clusters and the time slots, so as to satisfy the above two constraints.

By some reformulation, the just-stated problem can be converted into a maximum-bipartite-matching problem. Let G=(V, E) represent an undirected graph where V is a finite set of vertices and E is an edge set on V. A bipartite graph is an undirected graph G=(V, E) in which V can be partitioned into two sets L and R such that $(u, v) \in E$ implies either $u \in L$ and $v \in R$ or $u \in R$ and $v \in L$. That is, all edges go between the two sets L and R. A matching is a subset of edges $M \in E$ such that for any vertex pair (u, v) where $u \in L$ and $v \in R$, at most one edge of M connects between u and v.

A maximum matching is a matching M such that for any matching M', $|M| \geq |M'|$. To apply maximum-bipartite-matching to this problem, each vertex $u \in L$ is used to represent a frame cluster, and each vertex $v \in R$ is used to represent a time slot. An edge (u, v) exists if a frame cluster u is able to take time slot v without violating the time order constraint. If a frame cluster consists of multiple image segments, some from the first half of the original video, and some from the second half, this frame cluster will have multiple edges that leave it and enter different vertices in R.

A maximum-bipartite-matching solution is a best assignment between all the frame clusters and the time slots. Note that a best assignment is not necessarily unique.

Figure 2A:
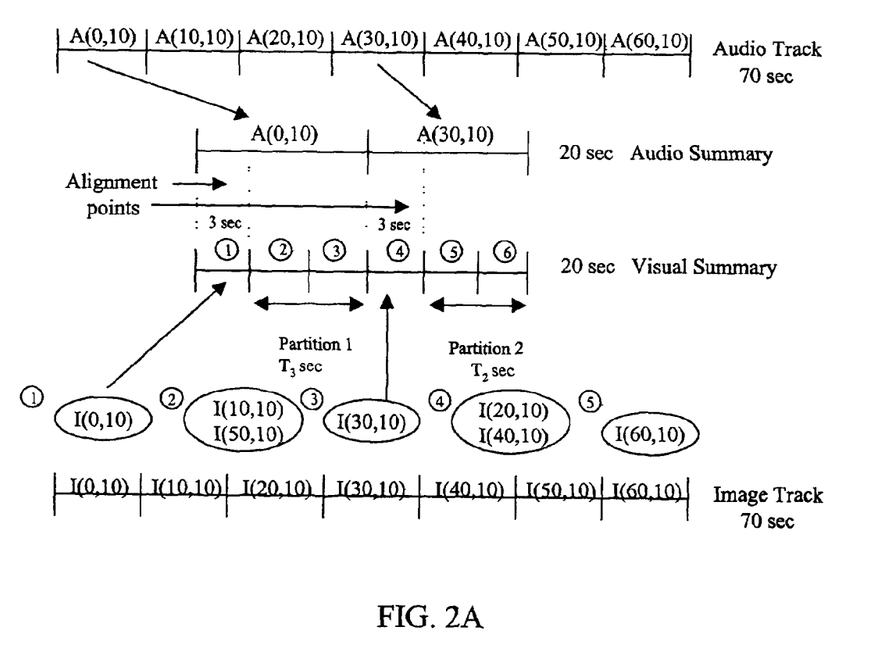
FIG. 2A shows an alignment process between audio and visual summaries.

FIG. 2A illustrates the alignment process between audio and visual summaries. In this figure, the original video program is 70 seconds long, its image track consists of seven image segments, each of which lasts for 10 seconds, and the audio track consists of seven spoken sentences, each 10 seconds long. The user has set $L_{sum}$=20 seconds, and $L_{min}$=3 seconds. Assume that the audio summarization has selected two spoken sentences A(0, 10) and A(30, 10), and that the visual content-based clustering has generated five frame clusters:

Cluster 1 that consists of I(0, 10);
Cluster 2 that consists of I(10, 10) and I(50, 10);
Cluster 3 that consists of I(30, 10);
Cluster 4 that consists of I(20, 10) and I(40, 10); and
Cluster 5 that consists of I(60, 10).

As the audio summary is formed by A(0, 10) and A(30, 10), it is necessary to examine the contents of the corresponding image segments I(0, 10) and I(30, 10) to determine whether alignment operations are required for A(0, 10) and A(30, 10). Suppose that I(0, 10) and I(30, 10) display the speakers of the spoken sentences A(0, 10), A(30, 10), respectively. In that case, according to the alignment rules, I(0, 10) will be aligned with A(0, 10), and I(30, 10) will be aligned with A(30, 10) for $L_{min}$ (three) seconds. Because I(0, 10) and I(30, 10) have been used once, they will not be used in other parts of the visual summary.

By these two alignment points, the remaining time period of the visual summary is divided into two partitions, with each lasting for seven seconds that can provide at most two time slots. Because there are three frame clusters and four time slots left for the alignment, there is a bipartite graph for the alignment task shown in FIG. 2B. Since frame cluster 2 consists of two image segments I(10, 10) and I(50, 10), it could take a time slot in either partition 1 or partition 2. If I(10, 10) is selected from frame cluster 2, it can take either time slot 2 or 3 in Partition 1. On the other hand, If I(50, 10) is selected, it can take either time slot 5 or 6 in Partition 2. Therefore, there are four edges leaving from cluster 2: one for time slot 2; one for time slot 3; one for time slot 5; and one for time slot 6. Similarly, there are four edges leaving from cluster 4: one for time slot 2; one for time slot 3; one for time slot 5; and one for time slot 6.

Figure 2B:
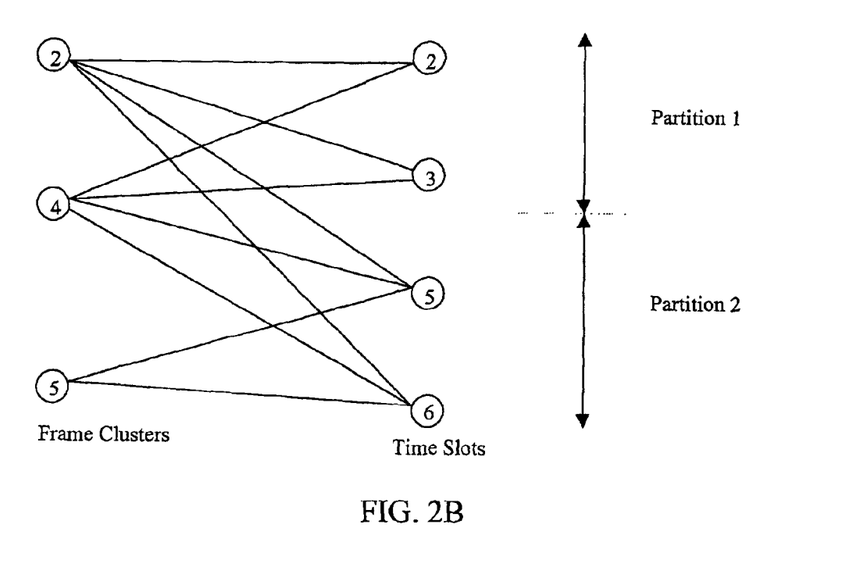
FIG. 2B shows a framework for the alignment.

On the other hand, frame cluster 5 consists of only one image segment I(60, 10), and can take either time slot 5 or 6 in partition 2. Therefore, there are two edges leaving from frame cluster 5.

Figure 2C:
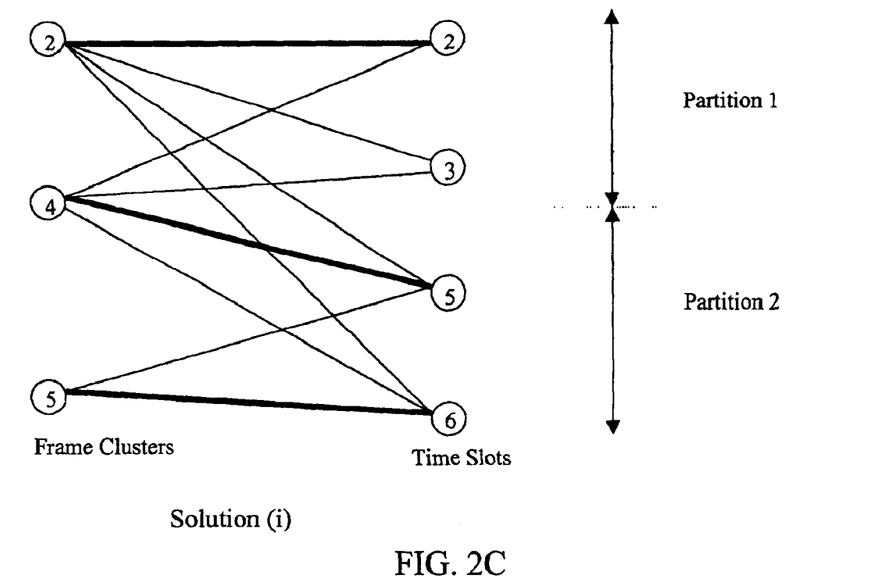
FIGS. 2C–2F show alternative solutions satisfying a time order constraint.
Figure 2D:
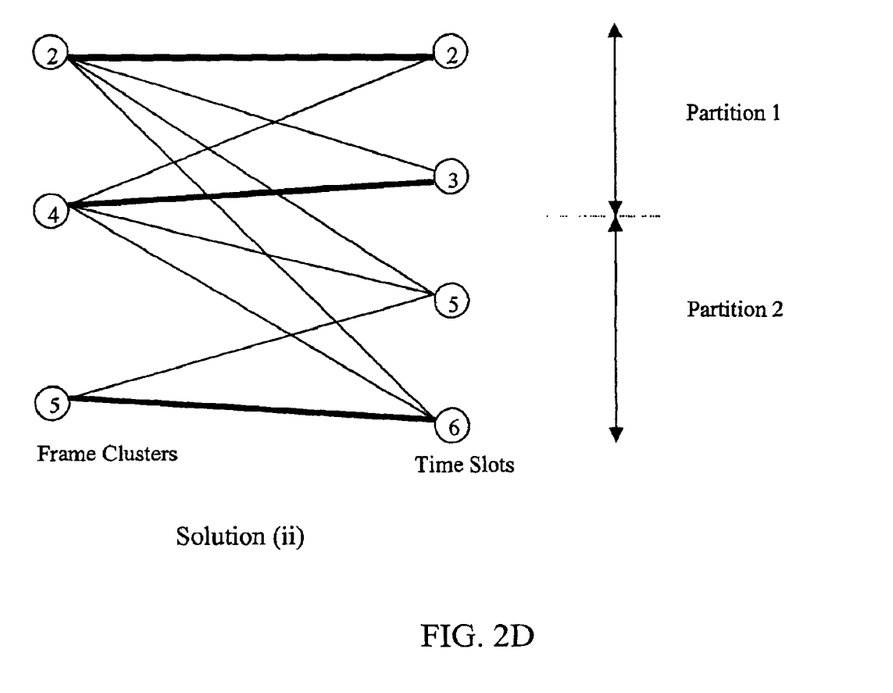

There are several possible maximum matching solutions for the bipartite graph in FIG. 2B. FIGS. 2C and 2D show two respective solutions. In solution (i), shown in FIG. 2C, time slot 3 remains unassigned. In solution (ii), shown in FIG. 2D, time slot 5 remains unassigned. In this case, since all the frame clusters have been used, it is necessary to fill the blank time slots using the frame clusters with multiple image segments. For solution (i) (FIG. 2C), image segment I(20, 10) in frame cluster 4 has to be used to fill the blank time slot. For solution (ii) (FIG. 2D), image segment I(50, 10) in frame cluster 2 has to be used to fill the blank time slot.

Figure 2E:
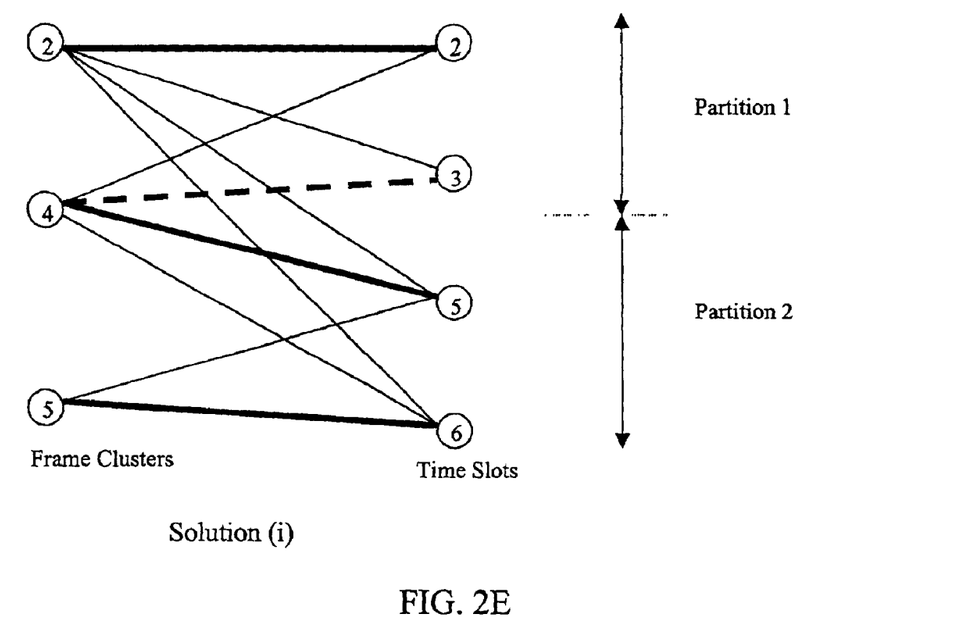
Figure 2F:
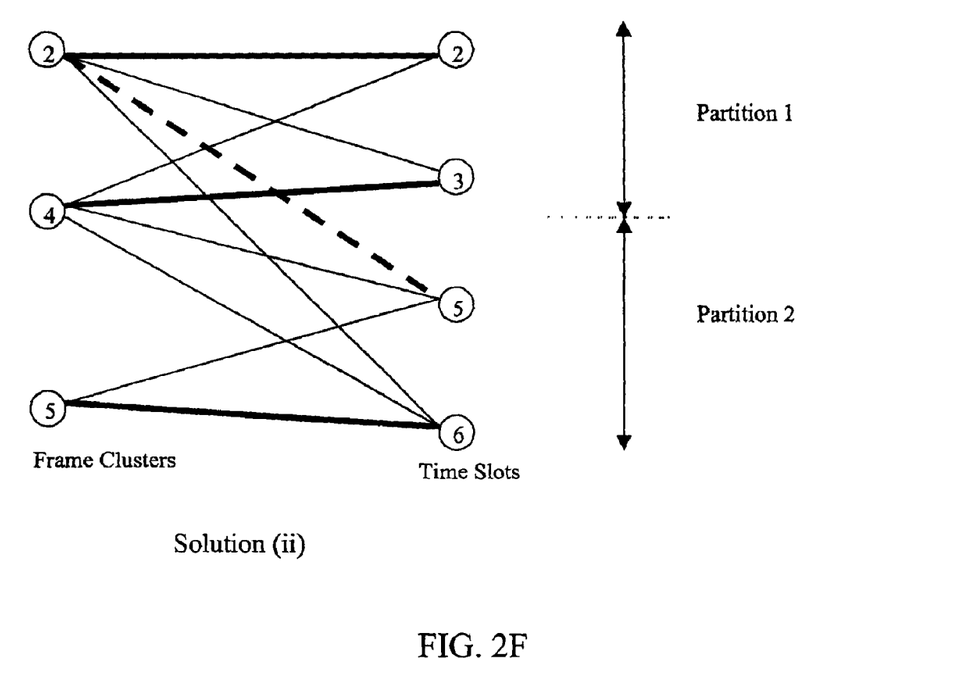

The foregoing example illustrates the fact that, although maximum-bipartite-matching will find a best matching between the available frame clusters and time slots, it may leave some time slots unassigned, especially when there are more available time slots than there are available frame clusters. To fill these unassigned time slots, the single assignment constraint may be loosened, those frame clusters with multiple image segments may be examined, and an appropriate segment that has not been used yet may be selected. In this manner, the time order constraint is satisfied. Respective solutions for the loosened single assignment constraint are shown in FIGS. 2E and 2F.

Figure 3A:
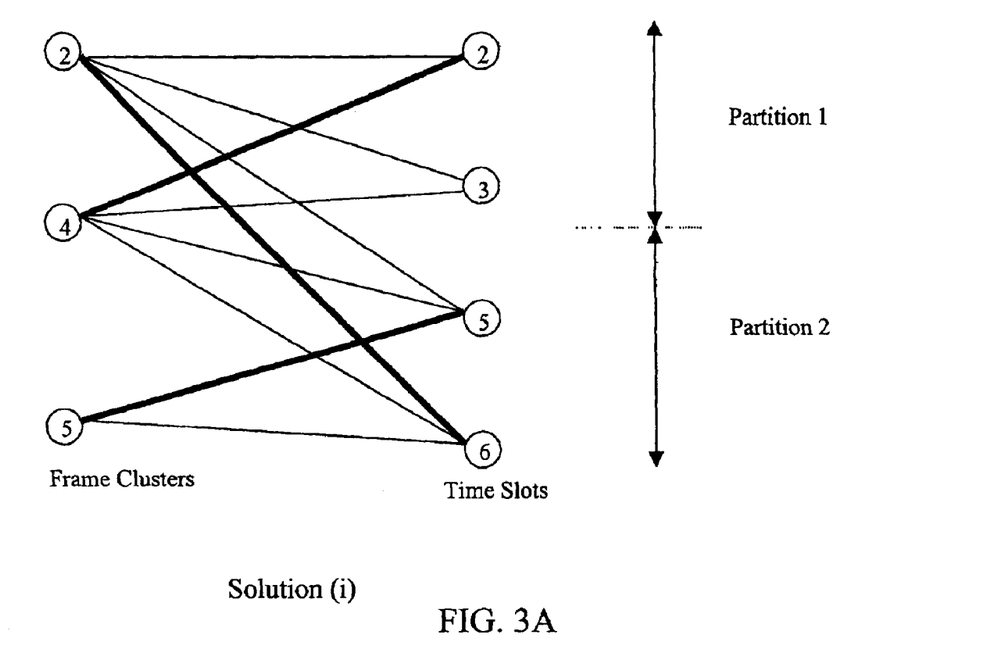
FIGS. 3A–3B are diagrams illustrating false solutions resulting from the inventive method.
Figure 3B:
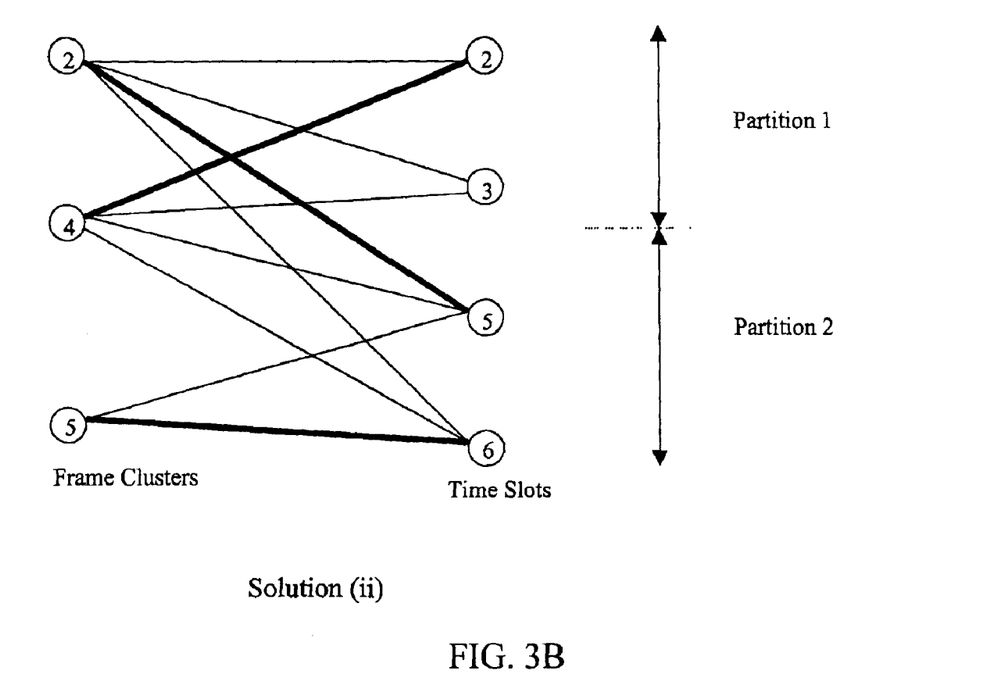

It is noted that the maximum-bipartite-matching operation may generate some false solutions. FIGS. 3A and 3B show two examples of this. In example (i) (FIG. 3A), because image segment I(60, 10) has been placed before image segment I(50, 10), it has violated the time order constraint. In example (ii) (FIG. 3B), although the assignment does not violate any constraints, assigning I(20, 10) to time slot 2 makes the assignment of time slot 3 impossible. However, these false solutions can be easily detected by examining them against the two constraints, and can be corrected by re-ordering the image segments assigned to the time slots in each partition. For example (i) (FIG. 3A), the problem can be corrected by sorting the two image segments assigned to Partition 2 in ascending time order. For example (ii) (FIG. 3B), the final solution can be reached by first filling the empty time slot using image segment I(10, 10) from frame cluster 2, which is the only remaining image segment that can be assigned to Partition 1, and then sorting the two image segments in the partition.

In summary, Step 2 of the alignment operation can be described as follows:

1. After the alignment points have been identified, determine the number of frame clusters and time slots that are left for the assignment, and construct a bipartite graph accordingly.
2. Apply the maximum-bipartite-matching algorithm to find a possible solution.
3. Examine the solution with the two constraints, and correct the violations by sorting the image segments within each partition.
4. If there exist some unassigned time slots, loosen the single assignment constraint, examine those frame clusters with multiple image segments, and select an appropriate segment that has not been used yet, and that satisfies the time order constraint.

While the invention has been described in detail above with reference to preferred embodiments, various modifications within the scope and spirit of the invention will be apparent to those of working skill in this technological field. Consequently, the invention should be considered limited only by the scope of the appended claims.

What is claimed is:

1. A method of creating an audio-centric audio-visual summary of a video program, said video program having an audio track and an image track, said method comprising:

selecting a length of time $L_{sum}$ of said audio-visual summary;

examining said audio track and image track;

identifying one or more audio segments from said audio track based on one or more predetermined audio, image, speech, and text characteristics which relate to desired content of said audio-visual summary, wherein said identifying is performed in accordance with a machine learning method which relies on previously-generated experience-based learning data to provide, for each of said audio segments in said video program, a probability that a given audio segment is suitable for inclusion in said audio-visual summary;

adding said audio segments to said audio-visual summary;

performing said identifying and adding in descending order of said probability until the length of time $L_{sum}$ is reached; and selecting only one or more image segments corresponding to the one or more identified audio segments, so as to yield a high degree of synchronization between said one or more audio segments and said one or more image segments.

2. A method as claimed in claim 1, wherein said identifying further comprises detecting audio segments comprising non-speech sounds; classifying said non-speech sounds according to contents; and, for each of said non-speech sounds, outputting a starting time code, length, and category.

3. A method as claimed in claim 2, wherein, when said audio segments comprise speech, said identifying comprises performing speech recognition on said audio segments to generate speech transcripts, and outputting a starting time code and length for each of said speech transcripts.

4. A method as claimed in claim 3, wherein, when there is closed captioning present, said method further comprises aligning the closed captioning and the speech transcripts.

5. A method as claimed in claim 4, wherein said identifying further comprises generating speech units either based on said aligning, if said closed captioning is present, or based on said speech transcripts, if said closed captioning is not present, and creating a feature vector for each of said speech units.

6. A method as claimed in claim 5, further comprising computing an importance rank for each of said speech units.

7. A method as claimed in claim 6, further comprising receiving said speech units and determining identities of one or more speakers.

8. A method as claimed in claim 1, wherein said identifying further comprises segmenting said image track into individual image segments.

9. A method as claimed in claim 8, further comprising extracting image features and forming an image feature vector for each of said image segments.

10. A method as claimed in claim 9, further comprising determining identities of one or more faces for each of said image segments.

11. A method as claimed in claim 1, wherein said probability is computed in accordance with a method selected from the group consisting of a Naïve Bayes method, a decision tree method, a neural network method, and a maximum entropy method.

12. A method of creating an image-centric audio-visual summary of a video program, said video program having an audio track and an image track, said method comprising:

selecting a length of time $L_{sum}$ of said audio-visual summary;

examining said image track and audio track of said video program;

identifying one or more image segments from said image track based on one or more predetermined image, audio, speech, and text characteristics which relate to desired content of said audio-visual summary, wherein said identifying is performed in accordance with a machine learning method which relies on previously-generated experience-based learning data to provide, for each of said image segments in said video program, a probability that a given image segment is suitable for inclusion in said audio-visual summary;

adding said one or more image segments to said audio-visual summary;

performing said identifying and adding in descending order of said probability until the length of time $L_{sum}$ is reached; and selecting only one or more audio segments corresponding to the one or more identified image segments, so as to yield a high degree of synchronization between said one or more image segments and said one or more audio segments.

13. A method as claimed in claim 12, wherein said identifying comprises segmenting said image track into individual image segments.

14. A method as claimed in claim 13, further comprising extracting image features and forming an image feature vector for each of said image segments.

15. A method as claimed in claim 14, further comprising determining identities of one or more faces for each of said image segments.

16. A method as claimed in claim 12, further comprising selecting a minimum playback time $L_{min}$ for each of said image segments in said audio-visual summary.

17. A method as claimed in claim 16, wherein $L_{min}$ is sufficiently small relative to $L_{sum}$ such that a relatively large number of audio segments and image segments are provided in said audio-visual summary, to provide a breadth-oriented audio-visual summary.

18. A method as claimed in claim 16, wherein $L_{min}$ is sufficiently large relative to $L_{sum}$ such that a relatively small number of audio segments and image segments are provided in said audio-visual summary, to provide a depth-oriented audio-visual summary.

19. A method as claimed in claim 12, wherein said identifying further comprises detecting audio segments comprising non-speech sounds; classifying said non-speech sounds according to contents; and, for each of said non-speech sounds, outputting a starting time code, length, and category.

20. A method as claimed in claim 19, wherein, when said audio segments comprise speech, said identifying further comprises performing speech recognition on said audio segments to generate speech transcripts, and outputting a starting time code and length for each of said speech transcripts.

21. A method as claimed in claim 20, wherein, when there is closed captioning present, said method further comprises aligning the closed captioning and the speech transcripts.

22. A method as claimed in claim 21, wherein said identifying further comprises generating speech units either based on said aligning, if said closed captioning is present, or based on said speech transcripts, if said closed captioning is not present, and creating a feature vector for each of said speech units.

23. A method as claimed in claim 22, further comprising computing an importance rank for each of said speech units.

24. A method as claimed in claim 23, further comprising receiving said speech units and determining identities of one or more speakers.

25. A method as claimed in claim 12, wherein said probability is computed in accordance with a method selected from the group consisting of a Naïve Bayes method, a decision tree method, a neural network method, and a maximum entropy method.

26. A method of creating an integrated audio-visual summary of a video program, said video program having an audio track and a video track, said method comprising:

selecting a length of time $L_{sum}$ of said audio-visual summary;

selecting a minimum playback time $L_{min}$ for each of said image segments to be included in the audio-visual summary;

creating an audio summary by selecting one or more desired audio segments until the audio-visual summary length $L_{sum}$ is reached, said selecting being determined in accordance with a machine learning method which relies on previously-generated experience-based learning data to provide, for each of said audio segments in said video program, a probability that a given audio segment is suitable for inclusion in said audio-visual summary;

computing, for each of said image segments, a probability that a given image segment is suitable for inclusion in said audio-visual summary in accordance with said machine learning method;

for each of said audio segments that are selected, examining a corresponding image segment to see whether a resulting audio segment/image segment pair meets a predefined alignment requirement;

if the resulting audio segment/image segment pair meets the predefined alignment requirement, aligning the audio segment and the image segment in the pair from their respective beginnings for said minimum playback time $L_{min}$ to define a first alignment point;

repeating said examining and aligning to identify all of said alignment points;

dividing said length of said audio-visual summary into a plurality of partitions, each of said partitions having a time period
  either starting from a beginning of said audio-visual summary and ending at the first alignment point; or
  starting from an end of the image segment at one alignment point, and ending at a next alignment point; or
  starting from an end of the image segment at a last alignment point and ending at the end of said audio-visual summary; and for each of said partitions, adding further image segments in accordance with the following:
  identifying a set of image segments that fall into the time period of that partition;
  determining a number of image segments that can be inserted into said partition;
  determining a length of the identified image segments to be inserted;
  selecting said number of the identified image segments in descending order of said probability that a given image segment is suitable for insertion in said audio-visual summary; and
  from each of the selected image segments, collecting a section from its respective beginning for said time length and adding all the collected sections in ascending time order into said partition.

27. A method as claimed in claim 26, wherein said identifying further comprises detecting audio segments comprising non-speech sounds; classifying said non-speech sounds according to contents; and, for each of said non-speech sounds, outputting a starting time code, length, and category.

28. A method as claimed in claim 27, wherein, when said audio segments comprise speech, said identifying further comprises performing speech recognition on said audio segments to generate speech transcripts, and outputting a starting time code and length for each of said speech transcripts.

29. A method as claimed in claim 28, wherein, when there is closed captioning present, said method further comprises aligning the closed captioning and the speech transcripts.

30. A method as claimed in claim 29, further comprising generating speech units either based on said aligning, if said closed captioning is present, or based on said speech transcripts, if said closed captioning is not present, and creating a feature vector for each of said speech units.

31. A method as claimed in claim 30, further comprising computing an importance rank for each of said speech units.

32. A method as claimed in claim 31, further comprising receiving said speech units and determining identities of one or more speakers.

33. A method as claimed in claim 26, wherein $L_{min}$ is sufficiently small relative to $L_{sum}$ such that a relatively large number of image segments are provided in said audio-visual summary, to provide a breadth-oriented audio-visual summary.

34. A method as claimed in claim 26, wherein $L_{min}$ is sufficiently large relative to $L_{sum}$ such that a relatively small number of image segments are provided in said audio-visual summary, to provide a depth-oriented audio-visual summary.

35. A method as claimed in claim 26, wherein said probability that said given audio segment is suitable for inclusion in said audio-visual summary is computed in accordance with a method selected from the group consisting of a Naïve Bayes method, a decision tree method, a neural network method, and a maximum entropy method.

36. A method as claimed in claim 26, wherein said probability that said given image segment is suitable for inclusion in said audio-visual summary is computed in accordance with a method selected from the group consisting of a Naïve Bayes method, a decision tree method, a neural network method, and a maximum entropy method.

37. A method as claimed in claim 26, wherein said identifying further comprises segmenting said image track into individual image segments.

38. A method as claimed in claim 37, further comprising extracting image features and forming an image feature vector for each of said image segments.

39. A method as claimed in claim 38, further comprising determining identities of one or more faces for each of said image segments.

40. A method of creating an audio-centric audio-visual summary of a video program, said video program having an audio track and an image track, said method comprising:
  selecting a length of time $L_{sum}$ of said audio-visual summary;
  examining said audio track and image track;
  identifying one or more audio segments from said audio track based on one or more predetermined audio, image, speech, and text characteristics which relate to desired content of said audio-visual summary, wherein said identifying is performed in accordance with a predetermined set of heuristic rules to provide, for each of said audio segments in said video program, a ranking so as to determine whether a given audio segment is suitable for inclusion in said audio-visual summary;
  adding said audio segments to said audio-visual summary;
  performing said identifying and adding in descending order of said ranking of audio segments until the length of time $L_{sum}$ is reached; and
  selecting only one or more image segments corresponding to the one or more identified audio segments, so as to yield a high degree of synchronization between said one or more audio segments and said one or more image segments.

41. A method as claimed in claim 40, wherein said identifying further comprises detecting audio segments comprising non-speech sounds; classifying said non-speech sounds according to contents; and, for each of said non-speech sounds, outputting a starting time code, length, and category.

42. A method as claimed in claim 41, wherein, when said audio segments comprise speech, said identifying comprises performing speech recognition on said audio segments to generate speech transcripts, and outputting a starting time code and length for each of said speech transcripts.

43. A method as claimed in claim 42, wherein, when there is closed captioning present, said method further comprises aligning the closed captioning and the speech transcripts.

44. A method as claimed in claim 43, further comprising generating speech units either based on said aligning, if said closed captioning is present, or based on said speech transcripts, if said closed captioning is not present, and creating a feature vector for each of said speech units.

45. A method as claimed in claim 44, further comprising receiving said speech units and determining identities of one or more speakers.

46. A method as claimed in claim 40, wherein said identifying comprises segmenting said image track into individual image segments.

47. A method as claimed in claim 46, further comprising extracting image features and forming an image feature vector for each of said image segments.

48. A method as claimed in claim 47, further comprising determining identities of one or more faces for each of said image segments.

49. A method as claimed in claim 40, further comprising computing said ranking for each of said speech units.

50. A method of creating an image-centric audio-visual summary of a video program, said video program having an audio track and an image track, said method comprising:

selecting a length of time $L_{sum}$ of said summary;

examining said image track and audio track;

identifying one or more image segments from said image track based on one or more predetermined image, audio, speech, and text characteristics which relate to desired content of said audio-visual summary, wherein said identifying is performed in accordance with a predetermined set of heuristic rules to provide, for each of said image segments in said video program, a ranking so as to determine whether a given image segment is suitable for inclusion in said audio-visual summary;

adding said one or more image segments to said audio-visual summary;

performing said identifying and adding in descending order of said ranking until the length of time $L_{sum}$ is reached; and selecting only one or more audio segments corresponding to the one or more identified image segments, so as to yield a high degree of synchronization between said one or more image segments and said one or more audio segments.

51. A method as claimed in claim 50, wherein said identifying comprises clustering image segments of said video program based on predetermined visual similarity and dynamic characteristics.

52. A method as claimed in claim 51, wherein said identifying comprises segmenting said image track into individual image segments.

53. A method as claimed in claim 52, further comprising extracting image features and forming an image feature vector for each of said frame clusters.

54. A method as claimed in claim 53, further comprising determining identities of one or more faces for each of said frame clusters.

55. A method as claimed in claim 50, wherein said identifying further comprises detecting audio segments comprising non-speech sounds, classifying said non-speech sounds according to contents; and, for each of said non-speech sounds, outputting a starting time code, length, and category.

56. A method as claimed in claim 55, wherein, when said audio segments comprise speech, said identifying comprises performing speech recognition on said audio segments to generate speech transcripts, and outputting a starting time code and length for each of said speech transcripts.

57. A method as claimed in claim 56, wherein, when there is closed captioning present, said method further comprises aligning the closed captioning and the speech transcripts.

58. A method as claimed in claim 57, further comprising generating speech units either based on said aligning, if said closed captioning is present, or based on said speech transcripts, if said closed captioning is not present, and creating a feature vector for each of said speech units.

59. A method as claimed in claim 58, further comprising computing an importance rank for each of said speech units.

60. A method as claimed in claim 59, further comprising receiving said speech units and determining identities of one or more speakers.

61. A method as claimed in claim 50, further comprising selecting a minimum playback time $L_{min}$ for each of said image segments in said audio-visual summary.

62. A method as claimed in claim 61, wherein $L_{min}$ is sufficiently small relative to $L_{sum}$ such that a relatively large number of audio segments and image segments are provided in said audio-visual summary, to provide a breadth-oriented audio-visual summary.

63. A method as claimed in claim 61, wherein $L_{min}$ is sufficiently large relative to $L_{sum}$ such that a relatively small number of audio segments and image segments are provided in said audio-visual summary, to provide a depth-oriented audio-visual summary.

64. A method of creating an integrated audio-visual summary of a video program, said video program having an audio track and a video track, said method comprising:

selecting a length $L_{sum}$ of said audio-visual summary;

selecting a minimum playback time $L_{min}$ for each of a plurality of image segments to be included in the audio-visual summary;

creating an audio summary by selecting one or more desired audio segments, said selecting being determined in accordance with a predetermined set of heuristic rules to provide, for each of said audio segments in said video program, a ranking to determine whether a given audio segment is suitable for inclusion in said video summary;

performing said selecting in descending order of said ranking of audio segments until said audio-visual summary length is reached;

grouping said image segments of said video program into a plurality of frame clusters based on a visual similarity and a dynamic level of said image segments, wherein each frame cluster comprises at least one of said image segments, with all the image segments within a given frame cluster being visually similar to one another;

for each of said audio segments that are selected, examining a corresponding image segment to see whether a resulting audio segment/image segment pair meets a predefined alignment requirement;

if the resulting audio segment/image segment pair meets the predefined alignment requirement, aligning the audio segment and the image segment in the pair from their respective beginnings for said minimum playback time $L_{min}$ to define a first alignment point;

repeating said examining and aligning to identify all of said alignment points;

dividing said length of said audio-visual summary into a plurality of partitions, each of said partitions having a time period
- either starting from a beginning of said audio-visual summary and ending at the first alignment point; or
- starting from an end of the image segment at one alignment point, and ending at a next alignment point; or
- starting from an end of the image segment at a last alignment point and ending at the end of said audio-visual summary; and dividing each of said partitions into a plurality of time slots, each of said time slots having a length equal to said minimum playback time $L_{min}$;

assigning said frame clusters to fill said time slots of each of said partitions based on the following:
- assigning each frame cluster to only one time slot; and
- maintaining a time order of all image segments in the audio-visual summary;

wherein said assigning said frame clusters to fill said time slots is performed in accordance with a best matching between said frame clusters and said time slots.

65. A method as claimed in claim 64, wherein said best matching is computed by a method of maximum-bipartite-matching.

66. A method as claimed in claim 65, wherein, if there are more time slots than frame clusters, identifying those frame clusters which contain more than one image segment, and assigning image segments from said identified frame clusters to time slots until all of said time slots are filled, while maintaining said time order of said image segments in said audio-visual summary.

67. A method as claimed in claim 66, further comprising reviewing said audio-visual summary to ensure that said time order is maintained, and, if said time order is not maintained, reordering said image segments that were added in each partition so that said time order is maintained.

68. A method as claimed in claim 64, wherein said identifying further comprises detecting audio segments comprising non-speech sounds, classifying said non-speech sounds according to contents; and, for each of said non-speech sounds, outputting a starting time code, length, and category.

69. A method as claimed in claim 68, wherein, when said audio segments comprise speech, said identifying comprises performing speech recognition on said audio segments to generate speech transcripts, and outputting a starting time code and length for each of said speech transcripts.

70. A method as claimed in claim 69, wherein, when there is closed captioning present, said method further comprises aligning the closed captioning and the speech transcripts.

71. A method as claimed in claim 70, further comprising generating speech units either based on said aligning, if said closed captioning is present, or based on said speech transcripts, if said closed captioning is not present, and creating a feature vector for each of said speech units.

72. A method as claimed in claim 71, further comprising computing an importance rank for each of said speech units.

73. A method as claimed in claim 72, further comprising receiving said speech units and determining identities of one or more speakers.

74. A method as claimed in claim 64, wherein $L_{min}$ is sufficiently small relative to $L_{sum}$ such that a relatively large number of image segments are provided in said audio-visual summary, to provide a breadth-oriented audio-visual summary.

75. A method as claimed in claim 64, wherein $L_{min}$ is sufficiently large relative to $L_{sum}$ such that a relatively small number of image segments are provided in said audio-visual summary, to provide a depth-oriented audio-visual summary.

76. A method as claimed in claim 64, wherein said identifying comprises segmenting said image track into individual image segments.

77. A method as claimed in claim 76, further comprising extracting image features and forming an image feature vector for each of said frame clusters.

78. A method as claimed in claim 77, further comprising determining identities of one or more faces for each of said image segments.

* * * * *

UNITED STATES PATENT AND TRADEMARK OFFICE
CERTIFICATE OF CORRECTION

PATENT NO. : 6,925,455 B2 Page 1 of 1
APPLICATION NO. : 10/011215
DATED : August 2, 2005
INVENTOR(S) : Yihong Gong and Xin Liu It is certified that error appears in the above-identified patent and that said Letters Patent is hereby corrected as shown below:

Col 9, line 66, delete --"Lsum"--

Signed and Sealed this

Fifth Day of September, 2006

JON W. DUDAS
*Director of the United States Patent and Trademark Office*